(12) United States Patent
Huang

(10) Patent No.: US 9,261,717 B2
(45) Date of Patent: Feb. 16, 2016

(54) ELECTRO-OPTIC MODULATOR

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/258,120

(22) Filed: Apr. 22, 2014

(65) Prior Publication Data

US 2014/0314365 A1    Oct. 23, 2014

(30) Foreign Application Priority Data

Apr. 23, 2013   (TW) .............................. 102114474 A

(51) Int. Cl.
| | |
|---|---|
| *G02F 1/035* | (2006.01) |
| *G02F 1/03* | (2006.01) |
| *G02F 1/01* | (2006.01) |
| *G02F 1/21* | (2006.01) |

(52) U.S. Cl.
CPC ............ *G02F 1/0316* (2013.01); *G02F 1/0134* (2013.01); *G02F 2001/212* (2013.01)

(58) Field of Classification Search
CPC ..... G02F 1/035; G02F 1/0353; G02F 1/0356; G02F 1/225; G02F 2001/0144; G02F 2001/212; G02F 1/0134; G02F 1/0316; G02B 6/29355
See application file for complete search history.

(56) References Cited

U.S. PATENT DOCUMENTS

| | | | | |
|---|---|---|---|---|
| 4,266,850 | A | * | 5/1981 | Burns ............................... 385/8 |
| 4,932,738 | A | * | 6/1990 | Haas et al. ........................ 385/2 |
| 5,233,453 | A | * | 8/1993 | Sivarajan et al. ............... 398/55 |
| 6,650,458 | B1 | * | 11/2003 | Prosyk et al. .................. 359/276 |
| 6,711,312 | B1 | * | 3/2004 | Kornrumpf et al. ............. 385/14 |
| 7,689,067 | B2 | * | 3/2010 | Ichikawa et al. .................. 385/3 |
| 9,091,900 | B2 | * | 7/2015 | Huang .................... G02F 1/225 |
| 2008/0212915 | A1 | * | 9/2008 | Ichikawa et al. .................. 385/3 |
| 2009/0324157 | A1 | * | 12/2009 | Sugiyama ......................... 385/2 |
| 2012/0162656 | A1 | * | 6/2012 | Kawanishi et al. ........... 356/450 |
| 2013/0216175 | A1 | * | 8/2013 | Onishi .............................. 385/1 |
| 2013/0315524 | A1 | * | 11/2013 | Saida et al. ....................... 385/3 |
| 2014/0147073 | A1 | * | 5/2014 | Huang .............................. 385/3 |

(Continued)

*Primary Examiner* — Rhonda Peace
(74) *Attorney, Agent, or Firm* — Novak Druce Connolly Bove + Quigg LLP

(57) ABSTRACT

Electro-optic modulator includes a substrate, a waveguide formed in a top surface of the substrate, a pair of first modulating electrodes and a pair of second modulating electrodes. The waveguide includes a Y-shaped incident member, a Y-shaped output member, first and second connection members. The Y-shaped incident member includes an incident portion, first and second incident branches. The Y-shaped output member includes an output portion, a first and second output branches. The first connection member includes a first non-modulated branch and a first modulated branch. The second connection member includes a second non-modulated branch and a second modulated branch. The first non-modulated branch and the first modulated branch are interconnected between the first incident branch and the first output branch in parallel. The second non-modulated branch and the second modulated branch are interconnected between the second incident branch and the second output branch in parallel.

7 Claims, 1 Drawing Sheet

(56) References Cited

U.S. PATENT DOCUMENTS

2014/0307993 A1* 10/2014 Huang .............................. 385/2
2014/0314364 A1* 10/2014 Huang .............................. 385/2
2014/0314365 A1* 10/2014 Huang .............................. 385/3
2014/0321790 A1* 10/2014 Huang .............................. 385/3
2014/0334765 A1* 11/2014 Huang .............................. 385/3

* cited by examiner

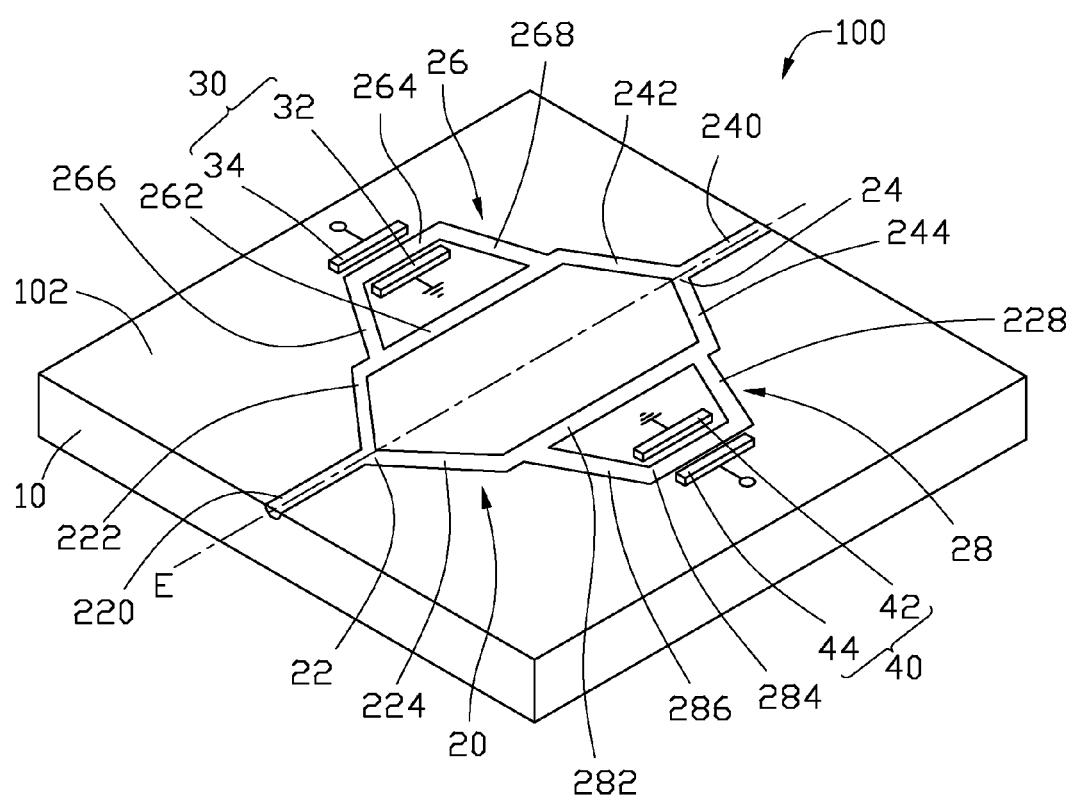

ELECTRO-OPTIC MODULATOR

FIELD

The present disclosure relates to integrated optics and, particularly, to an electro-optic modulator.

BACKGROUND

Electro-optic modulators change refractive index of a branch of a waveguide (hereinafter the modulated branch) by an electro-optic effect of a modulating electric field. Thus, the electro-optic modulator can alter a phase of light waves traversing the modulated branch. As a result, a phase shift is generated between the light waves traversing the modulated branch and light waves traversing another branch of the waveguide (hereinafter the non-modulated branch). The light waves traversing the modulated branch interface with light waves traversing the non-modulated branch. Output energy of the light waves of the waveguide is modulated as the output energy depends on the phase shift, which in turn depends on the modulating electric field.

In theory, when an input energy Qin of light waves of the waveguide is about Q, and the output energy Qout of light waves of the waveguide is about Q, it represents that the electro-optic modulator is full open. When an input energy Qin of light waves of the waveguide is about Q, and the output energy Qout of light waves of the waveguide is about zero, it represents that the electro-optic modulator is full closed. A ratio between a maximum output energy Qout and a minimum output energy Qout is defined as an information ratio. The larger the information ratio is, the more apparent the electro-optic modulator is open or closed.

BRIEF DESCRIPTION OF THE DRAWINGS

The FIGURE is an isometric, schematic view of an electro-optic modulator, according to an exemplary embodiment.

DETAILED DESCRIPTION

The FIGURE shows an electro-optic modulator 100 in accordance with an exemplary embodiment. The electro-optic modulator 100 includes a substrate 10, a waveguide 20, a pair of first modulating electrodes 30, and a pair of second modulating electrodes 40.

The substrate 10 includes a top surface 102. The substrate 10 is made of lithium niobate (LiNbO3) crystal to increase a bandwidth of the electro-optic modulator 100, the LiNbO3 crystal having a high response speed.

The waveguide 20 is formed in the top surface 102 by high temperature diffusion technology. The waveguide 20 includes a Y-shaped incident member 22, a Y-shaped output member 24, a first connection member 26, and a second connection member 28.

The Y-shaped incident member 22 includes an incident portion 220, a first incident branch 222, and a second incident branch 224.

The Y-shaped incident member 24 includes an output portion 240, a first output branch 242, and a second output branch 244.

The first connection member 26 includes a first non-modulated branch 262 and a first modulated branch 264. The first non-modulated branch 262 and the first modulated branch 264 branch from the first incident branch 222 and converge into the first output branch 242. In detail, the first connection member 26 further includes a first branching portion 266 and a first converging portion 268. The first non-modulated branch 262 is interconnected between the first incident branch 222 and the first output branch 242. The first non-modulated branch 262 is substantially parallel to the first modulated branch 264. The first branching portion 266 and the first converging portion 268 obliquely connect the first modulated branch 264 to the first incident branch 222 and to the first output branch 242, respectively. An included angle between the first branching portion 266 and the first non-modulated branch 262 is substantially equal to an included angle between the first converging portion 268 and the first non-modulated branch 262.

The second connection member 28 includes a second non-modulated branch 282 and a second modulated branch 284. The second non-modulated branch 282 and the second modulated branch 284 are both branches from the second incident branch 224 and are converged into the second output branch 244. In detail, the second connection member 28 further includes a second branching portion 286 and a second converging portion 288. The second non-modulated branch 282 is interconnected between the second incident branch 224 and the second output branch 244. The second non-modulated branch 282 is substantially parallel to the second modulated branch 284. The second branching portion 286 and the second converging portion 288 obliquely connect the second modulated branch 284 to the second incident branch 224 and to the second output branch 244, respectively. An included angle between the second branching portion 286 and the second non-modulated branch 282 is substantially equal to an included angle between the second converging portion 288 and the first non-modulated branch 282.

The pair of first modulating electrode 30 includes a first electrode 32 and a second electrode 34. The first electrode 32 and the second electrode 34 are arranged at opposite sides of the first modulated branch 264. The first electrode 32 is grounded, and the second electrode 34 is connected to a high potential.

The pair of second modulating electrode 40 includes a third electrode 42 and a fourth electrode 44. The third electrode 42 and the fourth electrode 44 are arranged at opposite sides of the second modulated branch 284. The third electrode 42 is grounded, and the fourth electrode 44 is connected to a high potential.

The first non-modulated branch 262 and the second non-modulated branch 282 are arranged between the first modulated branch 264 and the second modulated branch 284. The first electrode 32 is arranged between the first modulated branch 264 and the first non-modulated branch 262. The third electrode 42 is arranged between the second non-modulated branch 282 and the second modulated branch 284. Therefore, interference between the first modulating electrode 30 and the second modulating electrode 40 is reduced.

The electro-optic modulator 100 defines a central axis E. A central axis of the waveguide 20 coincides with the central axis E. That is, the central axis E coincides with the incident portion 220 and the output portion 240. The first incident branch 222 and the second incident branch 224 are symmetrical about the central axis E. The first output branch 242 and the second output branch 244 are symmetrical about the central axis E. The first non-modulated branch 262 and the second non-modulated branch 282 are symmetrical about the central axis E. The first modulated branch 264 and the second modulated branch 284 are symmetrical about the central axis E.

When in operation, light waves enter the electro-optic modulator 100 through the incident portion 220 and are divided into two equal portions through the first incident branch 222 and the second incident branch 224. Light waves traversing the first incident branch 222 are divided into two equal portions through the first non-modulated branch 262 and the first modulated branch 264 and are converged into the first output branch 242. Light waves traversing the second incident branch 224 are divided into two equal portions through the second non-modulated branch 282 and the second modulated branch 284 and are converged into the second output branch 244. Light waves traversing the first output branch 242 and light waves traversing the second output branch 244 are converged into the output portion 240. Light waves traversing the output portion 240 emit out of the electro-optic modulator 100.

During the above transmission process of light waves, an input energy Qin of light waves traversing the input portion 220 is about Q. A modulating electric field, generated by the first electrode 32 and the second electrode 34 when a modulating voltage is applied, interacts with the first modulated branch 264, and changes an effective refractive index of the first modulated branch 264, and alters a phase of the light waves traversing the first modulated branch 264 to make a phase shift between the light waves traversing the first modulated branch 264 and the light waves traversing the first non-modulated branch 262 be about π. As such, input energy Qmin/2 of light waves converging into the first output branch 242 approximates to zero. Simultaneously, a modulating electric field generated by the third electrode 42 and the fourth electrode 44 when a modulating voltage is applied, interacts with the second modulated branch 284 and changes an effective refractive index of the second modulated branch 284, and alters a phase of the light waves traversing the second modulated branch 284 to make a phase shift between the light waves traversing the second modulated branch 284 and the light waves traversing the second non-modulated branch 282 be about π. As such, input energy Qmin/2 of light waves converging into the second output branch 244 approximates to zero. In this situation, the electro-optic modulator 100 approximates to be fully closed. Output energy Qmin of the light waves traversing the output portion 240 approximates to zero.

A modulating electric field, generated by the first electrode 32 and the second electrode 34 when a modulating voltage is applied, interacts with the first modulated branch 264, and changes an effective refractive index of the first modulated branch 264, and alters a phase of the light waves traversing the first modulated branch 264 to make a phase shift between the light waves traversing the first modulated branch 264 and the light waves traversing the first non-modulated branch 262 be about zero. As such, input energy Qout/2 of light waves converging into the first output branch 242 approximates to Q/2. Simultaneously, a modulating electric field, generated by the third electrode 42 and the fourth electrode 44 when a modulating voltage is applied, interacts with the second modulated branch 284, and changes an effective refractive index of the second modulated branch 284, and alters a phase of the light waves traversing the second modulated branch 284 to make a phase shift between the light waves traversing the second modulated branch 284 and the light waves traversing the second non-modulated branch 282 be about zero. As such, input energy Qout/2 of light waves converging into the second output branch 244 approximates to Q/2. In this situation, the electro-optic modulator 100 approximates to be full open. Output energy Qout of light waves traversing the output portion 240 approximates to Q. Therefore, the information ratio can be increased.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electro-optic modulator comprising:
    a substrate comprising a top surface;
    a waveguide formed in the top surface and comprising a Y-shaped incident member, a Y-shaped output member, a first connection member, and a second connection member, the Y-shaped incident member comprising an incident portion, a first incident branch, and a second incident branch, the Y-shaped output member comprising an output portion, a first output branch, and a second output branch;
    the first connection member comprising a first non-modulated branch and a first modulated branch, the second connection member comprising a second non-modulated branch and a second modulated branch, the first non-modulated branch and the first modulated branch interconnected between the first incident branch and the first output branch in parallel, the second non-modulated branch and the second modulated branch interconnected between the second incident branch and the second output branch in parallel;
    a pair of first modulating electrode comprising a first electrode and a second electrode, arranged at opposite sides of the first modulated branch; and
    a pair of second modulating electrode comprising a third electrode and a fourth electrode arranged at opposite sides of the second modulated branch;
    wherein the electro-optic modulator defines a central axis E, a central axis of the waveguide coincides with the central axis E, structures of the waveguide on opposite sides of the central axis E are symmetrical; and
    wherein the first connection member further comprises a first branching portion and a first converging portion, the first non-modulated branch is substantially parallel to the first modulated branch, the first branching portion and the first converging portion obliquely connect the first modulated branch to the first incident branch and to the first output branch, respectively, and the first modulated branch, the first branching portion, the first non-modulated branch, and the first converging portion cooperatively form a trapezoid.

2. The electro-optic modulator of claim 1, wherein the second connection member further comprises a second branching portion and a second converging portion, the second non-modulated branch is substantially parallel to the second modulated branch, and the second branching portion and the second converging portion obliquely connect the second modulated branch to the second incident branch and to the second output branch, respectively.

3. The electro-optic modulator of claim 1, wherein an included angle between the first branching portion and the first non-modulated branch is substantially equal to an included angle between the first converging portion and the first non-modulated branch.

4. The electro-optic modulator of claim 3, wherein the first electrode is grounded, and the second electrode is connected to a high potential.

5. The electro-optic modulator of claim 4, wherein the third electrode is grounded, and the fourth electrode is connected to a high potential.

6. The electro-optic modulator of claim 5, wherein the first non-modulated branch and the second non-modulated branch are arranged between the first modulated branch and the second modulated branch, the first electrode is arranged between the first modulated branch and the first non-modulated branch, and the third electrode is arranged between the second non-modulated branch and the second modulated branch.

7. The electro-optic modulator of claim 6, wherein the substrate is made of lithium niobate (LiNbO3) crystal.

* * * * *